United States Patent [19]

Probst

[11] Patent Number: 4,635,175

[45] Date of Patent: Jan. 6, 1987

[54] SWITCHED DC-DC CONVERTER HAVING INPUT AND OUTPUT INDUCTANCES COUPLED BY SWITCHES AND STORAGE CAPACITANCES

[75] Inventor: Harald Probst, Munich, Fed. Rep. of Germany

[73] Assignee: Siemens Aktiengesellschaft, Berlin and Munich, Fed. Rep. of Germany

[21] Appl. No.: 465,119

[22] Filed: Feb. 9, 1983

[30] Foreign Application Priority Data

Feb. 25, 1982 [DE] Fed. Rep. of Germany ....... 3206767

[51] Int. Cl.[4] .......................................... H02M 3/155
[52] U.S. Cl. ........................................ 363/16; 363/39
[58] Field of Search .................... 363/15, 16, 39, 40, 363/60, 62, 65; 179/16 EA

[56] References Cited

U.S. PATENT DOCUMENTS

| 3,001,120 | 9/1961 | Bereskin | 363/126 |
| 3,340,458 | 9/1967 | Keller | 363/48 |
| 3,930,193 | 12/1975 | Kornrumpf et al. | 321/2 |
| 3,943,428 | 3/1976 | Whidden | 320/1 |
| 4,184,197 | 1/1980 | Cuk et al. | 363/16 |
| 4,186,437 | 1/1980 | Cuk | 363/65 |
| 4,257,087 | 3/1981 | Cuk | 363/16 |
| 4,262,328 | 4/1981 | Bloom et al. | 363/16 |
| 4,274,133 | 6/1981 | Cuk et al. | 363/39 |

FOREIGN PATENT DOCUMENTS 2052382 4/1972 Fed. Rep. of Germany ...... 307/110
2532212 1/1977 Fed. Rep. of Germany .
2551095 5/1980 Fed. Rep. of Germany .

OTHER PUBLICATIONS

Radio Shack Dictionary of Electronics, 1974–1975 Edition, p. 68.
Cuk et al, "Coupled Inductor and Other Extensions of a New Optimum Topology Switching DC-to-DC Converter".
Cuk et al, "A New Optimum Topology Switching DC-to-DC Converter", Power Electronics Specialists Conference, Palo Alto, Calif., Jun. 14–16, 1977, pp. 160–179.
IEEE Industrial Applications Society 12th Annual Meeting, Marriott Hotel, Los Angeles, Calif., Oct. 2–6, 1977, pp. 1110–1126.

Primary Examiner—William H. Beha, Jr.
Attorney, Agent, or Firm—Hill, Van Santen, Steadman & Simpson

[57] ABSTRACT

A circuit arrangement is disclosed for telecommunication systems, particularly for telephone exchange systems, having DC-DC converters. A converter has input inductances and output inductances and storage capacitors connecting the inductances and is provided with a further storage capacitor inserted in the current return path, the further storage capacitor effecting a DC-wise potential separation between user terminals and direct voltage source terminals.

7 Claims, 3 Drawing Figures

4,635,175

SWITCHED DC-DC CONVERTER HAVING INPUT AND OUTPUT INDUCTANCES COUPLED BY SWITCHES AND STORAGE CAPACITANCES

BACKGROUND OF THE INVENTION

1. Field of the Invention

The present invention relates to a circuit arrangement for telecommunication systems, particularly for telephone exchange systems, including DC-DC converters which are respectively connected at their input side to a pole of a DC source over an input inductance and are connected at their output side over an output inductance to one of two input terminals of a user and which respectively conduct a nonpulsating direct current at their input side and at their output side and in which the terminal of the input inductance facing away from the input of the converter and the terminal of the output inductance facing away from the output are connected to one another by way of a storage capacitor. Furthermore, on the basis of a switch arrangement, the storage capacitor is connectible between the input inductance and the other pole at the direct voltage source and the terminal of the output inductance facing away from the output is connected both to the other input terminal of the user, being continuously alternately connectible therewith, and the storage capacitor is switchable between the output inductance and the other input terminal of the user and the terminal of the input inductance facing away from the input of the transducer is connectible to the other pole of the direct voltage source.

2. Description of the Prior Art

A circuit arrangement of the type generally set forth above is already known from the German published application No. 2,842,262, particularly with reference to FIG. 5, which publication is fully incorporated herein by this reference. This arrangement provides that one terminal of a user is connected over the DC-DC converter to the one terminal of the direct voltage source, whereas the other terminal of the user is directly connected to the other terminal of the direct voltage source. For the purpose of a DC-wise potential separation, FIGS. 10ff of the published application provide a transformer which, therefore, is required in addition to the mentioned inductances.

SUMMARY OF THE INVENTION

Beginning with a DC-DC converter of the type mentioned above, it is therefore the object of the present invention to achieve the requirement of a galvanic separation of the user circuit from the direct voltage source in a different manner for the purpose of saving expense in addition to achieving the requirement for a continuous input current and a continuous output current.

The above object is achieved, according to the present invention, in that the switchable connection of the storage capacitor to the other terminal of the direct voltage source extends over a second storage capacitor and in that the switchable connection of the first storage capacitor to the second input terminal of the user also extends over the same.

Given the assistance of the present invention, therefore, it is possible to set the potential of the output terminals of the DC-DC converter as desired. It is possible, for example, to place one of the two output terminals to ground potential as desired and, accordingly, to selectively supply negative potential or positive potential to the user over the other of the two output terminals.

BRIEF DESCRIPTION OF THE DRAWING

Other objects, features and advantages of the invention, its organization, construction and operation will be best understood from the following description taken in conjunction with the accompanying drawing, on which.

DESCRIPTION OF THE PREFERRED EMBODIMENTS

Figure 1:
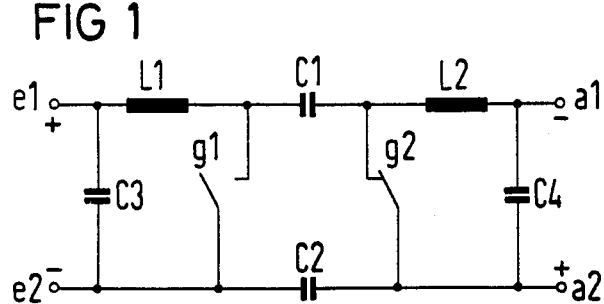
FIG. 1 is a schematic circuit diagram illustrating the basic principle of the invention.

Referring to FIG. 1, a circuit arrangement is illustrated which shows the basic principle of the present invention in a simple construction on the basis of a circuit configuration for which there are a multitude of further design possibilities. Of these, some are reproduced in the circuit arrangements according to FIGS. 2 and 3.

The circuit arrangement of FIG. 1 will be described first. The circuit arrangement of FIG. 1 comprises two input terminals e1 and e2 and two output terminals a1 and a2. The input terminals are connected to the two terminals of a direct voltage source. Therefore, one of the terminals corresponds to the one pole of a direct current source and the other terminal corresponds to the other terminal of the direct current source. The two input terminals of a user are connected to the two output terminals a1 and a2. The user can be various types of telecommunications equipment, for example control devices, switching matrix setting devices, subscriber terminal circuits, concentrators, subscriber stations, etc, as well as portions of such devices.

Figure 2:
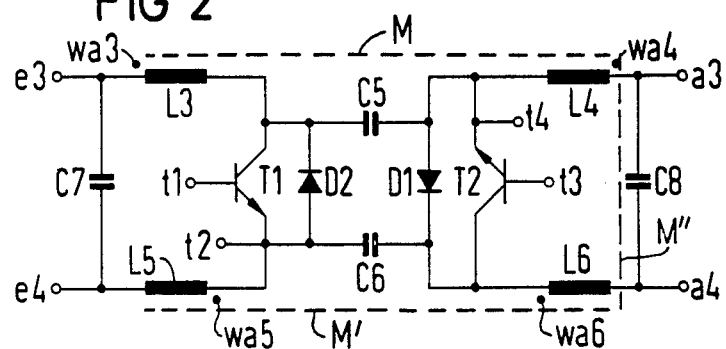
FIG. 2 illustrates, in schematic form, an exemplary embodiment of the invention.

Among other things, the DC-DC converter illustrated in FIG. 1 comprises an input inductance L1 and an output inductance L2. In addition, the DC-DC converter comprises two storage capacitors C1 and C2. Provided beyond the elements mentioned above is a circuit arrangement which, given a realization of the invention according to FIG. 1, is designed in the form of mechanical contacts G1 and G2. These contacts can be contacts of a relay, but they can also be the contacts of a continuously oscillating contact system. The input inductance L1 and the output inductance L2 can be electro-magnetically coupled. It is advantageous for this purpose to combine the inductances L1 and L2 into a single, electro-magnetic component, for example a choke. Such a coupling is illustrated in FIG. 2, for example, where the input inductance L3 and the output inductance L4 are commonly referenced M. In the case of an electro-magnetic coupling of the input inductance to the output inductance, the direction of winding of each of the two is of significance. In FIG. 2, the beginning of the winding of the input inductance L3 is referenced wa3 and the beginning of the winding of the output inductance L4 is referenced wa4. Thereby, one is to proceed on the basis that both windings are manufactured in the same sense of rotation concerning the manufacture of the winding.

Returning to FIG. 1, the manner of operation is to be explained below. Let it be assumed that the input inductance L1 exhibits the same electrical values as does the output inductance L2. Further, the capacitor C1 and C2 have the same capacitance; the capacitor C3 and C4 can also exhibit identical capacitance.

In the switching state illustrated in FIG. 1, the capacitor C1 and C2 are charged over the input inductance L1 and the closed contact g2; they are connected over the terminals to the direct voltage source. The contact g1 and g2 are always actuated at the same time. When these contacts are switched from their illustrated idle position into their respective work position, the contact g1 thereby closes, in contrast whereto the contact g2 opens. Now, proceeding on the assumption that the pole of the direct voltage source connected to the input terminal e1 is the positive terminal, and the pole of the direct voltage source connected to the input terminal e2 is the negative terminal, then the capacitor C1 and C2 are charged during the time the contact g2 is closed and the contact g1 is open such that, after the contact g1 is closed and the contact g2 is opened contact positive potential in comparison to the potential prevailing at the output terminal a1 appears at the output terminal a2. Therefore, a current flows over the output inductance L2, the storage capacitor C1, the contact g1, the source capacitor C2 and over the user (output terminal a2/a1).

During the time that the contact g1 is closed, moreover, a current flows from the direct voltage source over the input terminal e1, the input inductance L1, the contact g1, and over the input terminal e2 back to the direct voltage source. In this switching state, the storage capacitor C1 and C2 are partially discharged. The discharge process, however, lasts only a relatively slight fraction of the time interval which is determined by the time constant of the discharge circuit. The discharge operation for the storage capacitors C1 and C2 is first again terminated in that the contacts g1 and g2 return to their illustrated position. The two storage capacitors C1 and C2 are now re-charged over the input inductance L1 and the contact g2. Since the output inductance L2 in the preceding switch state (contact g1 open and contact g2 closed) was traversed by current in the described discharge circuit for the storage capacitor C1 and C2, it serves as a voltage source for the circuit extending over the user after the contact g2 is closed due to its inductive effect. After the respective opening of the contact g1 and the closing of the contact g2, the input inductance L1 provides that the current continues to flow over the input inductance L1 at nearly full strength, that, therefore, a current of nearly equal magnitude flows over the direct voltage source during the time that the contact g1 is closed and the contact g2 is open, on the one hand, and, on the other hand, during the time that the contact g1 is open and the contact g2 is closed. In the same manner, the output inductance L2 serves the purpose of having a current of nearly identical magnitude flow over the user during, on the one hand, the time that the contact g1 is closed and the time that the contact g2 is open and, on the other hand, during the time that the contact g1 is open and the time that the contact g2 is closed.

As already mentioned, when a user is connected to the output terminal a1 and a2 of the DC-DC converter according to FIG. 1, this likewise conducts a continuous input current which flows over the direct voltage source and the input terminals e1 and e2 and also conducts a continuous output current over the user and the output terminals a1 and a2. The continuous nature of the input current and of the output current does not exclude a slight ripple. As known, this ripple is all the smaller the higher the frequency with which the contacts g1 and g2 are actuated. Furthermore, this ripple is additionally reduced both at the input side and at the output side by the manner of operation of the capacitor C3 and C4. The continuous nature of these currents, therefore, means that they do not pulsate despite the constantly alternating actuation of the contact g1 and g2. The terminal of the inductance L1 facing away from the input of the DC-DC converter and the terminal of the output inductance L2 facing away from the output of the converter are therefore connected to one another via the storage capacitor C1. Accomplished with the assistance of a switch arrangement which comprises the contact g1 and g2 is that the storage capacitor is switchable between the input inductance L1 and the other terminal of the direct voltage source which corresponds to the input terminal a2 and that the terminal of the output inductance L2 facing away from the output of the converter is connectible to the other input terminal of the user corresponding to the output terminal a2 and, in continuous alternation therewith, both that the storage capacitor C1 is switchable between the output inductance L2 and the other input terminal of the user corresponding to the output terminal a2 and that the terminal of the input inductance L1 facing away from the input of the converter is connectible to the other terminal of the direct voltage source corresponding to the input terminal a2. As can therefore also be derived from FIG. 1, the switchable connection of the storage capacitor C1 to the other terminal of the direct voltage source which corresponds to the input terminal a2 extends over the second storage capacitor C2; further extending over the same storage capacitor C2 is also the switchable connection of the first storage capacitor C1 to the second input terminal of the user which corresponds to the output terminal a2. A DC-wise potential separation between the input terminals of the DC-DC converter and its output terminals is achieved with the assistance of the second storage capacitor C2. When one proceeds, for example, on the basis that the input terminal e1 carries ground potential from the direct voltage source, then the one or the other of the two output terminals can, freely selectable, be connected to a terminal carrying ground potential. As a function thereof, the respective other output terminal of the DC-DC converter according to FIG. 1 then conducts positive potential or negative potential relative to ground potential.

Referring now to the circuit arrangement of FIG. 2, a diode D2 and a transistor T2 shall first be eliminated from consideration. Comparison with the circuit arrangement according to FIG. 1 shows that an input inductance L5 and an output inductance L6 are additionally provided in FIG. 2. These two inductances are connected between the input terminal e4 and a second storage capacitor C6 and between the second output terminal a4 and, likewise, the storage capacitor C6. The input inductances L3 and L5 have the same electrical values, just like the output inductances L4 and L6. Consequently, a format occurs which is completely electrically balanced.

It can be further seen from the circuit arrangement according to FIG. 2 that the inductances L3 and L4 are electro-magnetically coupled together, as indicated by the broken line M, as are the inductances L5 and L6, as indicated by the broken line M'. As known, the mutually-coupled inductances should have identical electrical values. Proceeding on the basis that the respective mutually-connected inductances are realized by windings which are manufactured based on the same winding structure, it should be noted that the input terminal e3 connected to the beginning wa3 of the winding of the input inductance L3 and the beginning wa4 of the winding of the output inductance L4 is connected to the output terminal e3. The situation is reversed with respect to the beginnings wa5 and wa6 of the windings of the inductances L5 and L6 and this can be derived without further mention from the drawing of the circuit illustrated in FIG. 2. The possibility of mutually coupling all four inductances electro-magnetically according to FIG. 2 also exists as indicated by the broken line M" linking the broken lines M and M'. This means that a single electro-magnetic component can be employed, carrying four different windings, which form the four inductances according to FIG. 2. Whereas the circuit arrangement according to FIG. 1 is advantageously suited for feeding users not having their own potential-wise linkage, the circuit arrangement according to FIG. 2 (leaving the manner of operation of the transistor T2 and of the diode D2, not described until below, out of consideration) is, because of its balanced structure on the basis of the additional inductances L5 and L6 compared to FIG. 1, particularly suitable for feeding users in which a single-sided, potential-wise linkage of one of the two terminals serving for the DC feed is provided on the part of the respective user. Further, given such a circuit arrangement, a potential allocation of the one or of the other of the two output terminals is possible, as desired, without limitation.

Differing from FIG. 1, a transistor T1 and a diode D1 are employed as switches in the circuit of FIG. 2. The transistor T1 is driven in a known manner by way of its emitter-base path (drive terminals t1 and t2), to which end a multivibrator can be employed. By so doing, the transistor T1 is alternately switched conductive and non-conductive. Its manner of operation corresponds to that of the contact g1 in FIG. 1. The diode D1 is loaded in the non-conducting direction whenever the transistor T1 is conductive. Whenever the transistor T1 is conductive, a voltage arises at the diode D1 which places the diode D1 in the forward conducting direction, i.e. the diode D1 is conductive. As is known, electro-magnetic coupling of one input inducted to the respective output inductance corresponding thereto effects a further reduction of the ripple, both of the input current and of the output current.

The diode D2 and the transistor T2 will now be discussed with respect to the circuit arrangement according to FIG. 2. The circuit arrangement illustrated in FIG. 2 represents a DC-DC converter for both direction of transmission. When the transistor T1 is alternately fully conductive and fully blocked, then the DC-DC converter according to FIG. 2 operates in such a manner that it fed by a direct voltage source connected to the input terminal e3 and e4 and supplies direct voltage energy to a user connected at the output terminal a3 and a4. However, a direct voltage source can just as easily be connected to the output terminals a3 and a4 and a user can be connected to the input terminal e3 and e4. In this case, the transistor T2 is to be continuously alternately fully conductive and fully blocked, whereby the diode D2 always conducts current when the transistor T2 is blocked and has an inhibiting effect when the transistor T2 conducts current. The circuit arrangement according to FIG. 2 therefore allows voltage transformation in both directions. The polarity to be respectively observed for the proper connection of the direct voltage source, as well as the respective polarity of the output voltage supplied by the DC-DC converter, derive in a manner analogous to that of the circuit arrangement illustrated in FIG. 2.

With reference to the circuit arrangement illustrated in FIG. 2, a further possibility exists for developing the invention which should be noted herein. Four-quadrant operation can be realized with two DC-DC converters according to FIG. 2 whose inputs are connected in parallel and whose outputs are connected in series relative to one another. It is therefore possible to generate a galvanically-separated output voltage of a polarity controllable as desired, whereby a symmetrical, alternative drive can be provided for the two DC-DC converters.

Figure 3:
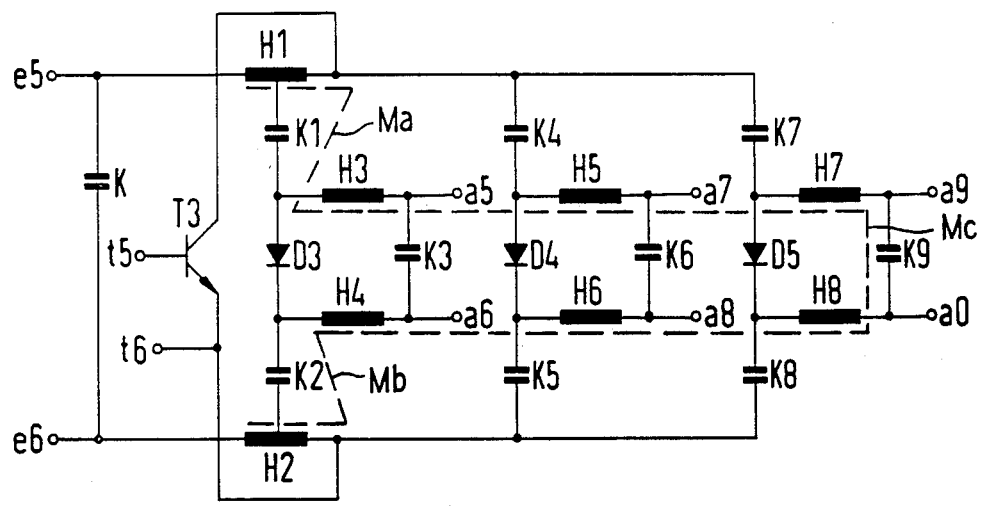
FIG. 3 is a schematic circuit diagram of a further illustrative embodiment of the invention.

Finally, reference is made to the circuit arrangement according to FIG. 3. Two input inductances H1 and H2 are provided in the circuit of FIG. 3. These input inductances correspond to the input inductances L3 and L5 of the circuit arrangement according to FIG. 2. The transistor T3 in FIG. 3 corresponds to the transistor T1 in FIG. 2. A number of pairs of output terminals a5, a6 and a7 and a8, and a9 and a0 are provided in FIG. 3 for a plurality of users to be fed independently of one another. These users are not only separated DC-wise from the direct voltage sources connected to the input terminal e5 and e6, but are also separated DC-wise from one another. The capacitors K1, K2 and K3 and the output inductances H3 and H4 are assigned to one another and are assigned to the two output terminals a5 and a6. The analogous case applies to the capacitors K4, K5 and K6 and to the output inductances H5 and H6 and the analogous case also applies to the capacitors K7, K8 and K9 and the output inductances H7 and H8. The capacitors K4 and K5 in FIG. 3 are connected to those winding terminals of the input inductances H1 and H2 which face away from the input terminals e5 and e6. In contrast thereto, the capacitors K1 and K2 are connected to winding taps of the input inductances H1 and H2. By so doing, different voltage and current transformation ratios can be achieved. Therefore, feed voltages selectable as desired can be supplied over the output terminal a5 and a6, a7 and a8, and a9 and a0, to the users. This can be accomplished with the assistance of winding taps at the input inductances H1 and H2. With this structure, the inductances H1, H3, H5 and H7 can again be electro-magnetically coupled to one another as indicated by the broken line Ma, as can the inductances H2, H4, H6 and H8 as indicated by the broken line Mb. It is likewise also possible to electro-magnetically couple all inductances to one another as indicated by the broken line Mc which links the broken lines Ma and Mb. Connected therewith is the aforementioned possibility of realizing all inductances as a single electro-magnetic component.

Finally, it should also be pointed out that there is a further possibility of having the switchable connection between the two terminals of the storage capacitors facing the direct voltage source extend not over one of the two switches (in FIG. 2 over the transistor T1 and, in FIG. 3, over the transistor T3) but, on the contrary, over the winding taps of the input inductances L3 and L5 or, respectively, K1 and K2. By so doing, an even greater variety of possibilities of voltage transformation ratios up (and voltage transformation ratios down) between the input terminals and the output terminals can be achieved.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A DC-DC converter arrangement for a telecommunication system, comprising:

first and second input terminals for receiving non-pulsating direct current;

first and second output terminals for delivering non-pulsating direct current;

a first inductance connected to said first input terminal;

a second inductance connected to said first output terminal;

a common magnetic core carrying said first and second inductances;

a third inductance carried on said common core;

a fourth inductance carried on said common core;

a first capacitor connected between and in series with said first and second inductances and therewith defining first and second junctions;

a second capacitor connected in series between said second input terminal and said second output terminal;

said third inductance connected between said second input terminal and said second capacitor and therewith defining a third junction;

said fourth inductance connected between said second output terminal and said second capacitor and therewith defining a fourth junction;

said first and second inductances inductively coupled to one another, and said third and fourth inductances inductively coupled to one another;

a first switch connected between said first and third junctions, and a second switch connected between said second and fourth junctions, said first and second switches alternately operated to switch said first capacitor between said first inductance and said input terminal via said third inductance and to switch said second inductance to said second output terminal via said fourth inductance, to switch said first capacitor between said second inductance and said second output terminal via said second capacitor and said fourth inductance and to connect said first inductance to said second input terminal via said third inductance, whereby the connection of said first capacitor to said second input terminal and to said second output terminal occurs via said second capacitor.

2. The DC-DC converter arrangement according to claim 1, wherein:

said switches each comprise transistors.

3. The DC-DC converter arrangement according to claim 1, wherein:

each of said capacitors comprises a pair of terminals; and comprising a transistor constituting one of said switches and connected to the terminals of said capacitors which face said input terminals; and a current direction dependent resistor connected to said terminals which face said output terminals.

4. The DC-DC converter arrangement according to claim 3, wherein:

said transistor includes a negative pole and a positive pole;

said resistor is a diode and includes a negative pole and a positive pole; and said transistor has its negative pole connected to said first inductance and said diode has its negative pole connected to said second inductance.

5. The DC-DC converter arrangement according to claim 3, wherein:

said transistor includes a negative pole and a positive pole;

said resistor is a diode and includes a negative pole and a positive pole; and said transistor has its positive pole connected to said first inductance and said diode has its positive pole connected to said second inductance.

6. A DC-DC converter arrangement for a telecommunication system, comprising:

first and second input terminals for receiving a non-pulsating direct current and first and second output terminals for delivering a non-pulsating direct current;

a magnetic core;

a single winding on said magnetic core including first, second, third and fourth inductances, said first inductance including a first tap and said third inductance including a second tap, said first and third inductances respectively connected to said first and second input terminals and said second and fourth inductances respectively connected to said first and second output terminals;

a diode including an anode and a cathode;

a first capacitor connected between said first tap and said second inductance and connected in common with said second inductance and said anode;

a second capacitor connected between said second tap and said fourth inductance and connected in common with said fourth inductance and said cathode; and a transistor which is operable alternately to conduct and to block and including a current conductive path connected to said first and third inductances on the sides thereof which are not connected to said input terminals.

7. The DC-DC converter arrangement according to claim 6, and further comprising:

at least third and fourth output terminals;

fifth and sixth inductances respectively connected to said third and fourth output terminals;

third and fourth capacitors respectively connecting said fifth and sixth inductances respectively to said first and third inductances and to said current conduction path of said transistor; and a further diode connecting said third and fourth capacitors and poled in the same direction as said transistor.

* * * * *